United States Patent [19]

Lei

[11] Patent Number: 5,373,146

[45] Date of Patent: Dec. 13, 1994

[54] CARD BASED ACCESS SYSTEM WITH READER UPDATING OF THE MEMORY

[76] Inventor: Chin-Shan Lei, Suite 1, 11F, 95-8 Chang Ping Road, Sec. 1, Taichung, Taiwan, Prov. of China

[21] Appl. No.: 96,965

[22] Filed: Jul. 26, 1993

[51] Int. Cl.$^5$ .............................. H04Q 9/00
[52] U.S. Cl. .................. 235/382.5; 235/468; 235/382; 340/825.32
[58] Field of Search ............ 235/375, 380, 379, 382, 235/492, 468, 382.5; 283/88, 91, 901; 340/825.32

[56] References Cited

U.S. PATENT DOCUMENTS

| | | | |
|---|---|---|---|
| Re. 28,081 | 7/1974 | Travioli | 235/380 |
| 3,919,447 | 11/1975 | Kilmer, Jr. et al. | 283/91 |
| 4,013,894 | 3/1977 | Foote et al. | 250/569 |
| 4,245,213 | 1/1981 | Kriger | 340/825.32 |
| 4,396,914 | 8/1983 | Aston | 235/382 |
| 4,436,991 | 3/1984 | Albert et al. | 235/468 |
| 4,504,084 | 3/1985 | Jauch | 283/91 |
| 4,519,228 | 5/1985 | Sornes | 235/382.5 |
| 4,538,059 | 8/1985 | Rudland | 235/468 |
| 4,743,898 | 5/1988 | Imedio | 235/382 |
| 5,169,155 | 12/1992 | Soyles et al. | |

Primary Examiner—John Shepperd

[57] ABSTRACT

A card identification system comprises generally a card reader head composed of a light generating unit, a main circuit A/D convertion unit, a transmitter/receiver rack, a MF keyboard decode unit, a LCD unit and a CPU, and a reader device composed of a MF keyboard decode unit, a LCD unit, a EEPROM unit, a CPU and a driver device thereof. This disclosure is characterized in adapting an infrared ray scanning method to the card reader head therein to precisely detect a symbol on a identification card which can be unlimitedly made from a variety of materials. The identification code marked on the card may be made by printing or perforating a symbol or sticking up a tape, or a sticker thereon.

4 Claims, 6 Drawing Sheets

CARD BASED ACCESS SYSTEM WITH READER UPDATING OF THE MEMORY

BACKGROUND OF THE INVENTION

The present invention relates to card identification system and more particularly to a computerized card identification system which is adapted to a card made of any opague or translucent material and marked or perforated random symbol or symbols thereon. The symbol of a card which is recorded previously in a memory of a microprocessor thereof is detected by a card reader head having an infrared scanning device therein to sensitively detect the symbol on the card and transmit a signal to the microprocessor for conducting precise identification.

An identification card used in a conventional card identification system, e.g., a door check-point, is generally made from a plastic card coated with a magnetic strip for registering an identification code thereon. Once the card has been registered with a specific identification code that can not be changed because the code on the magnetic strip is preseted and prescribed in progresive order. Therefore, the identification card is very difficult to duplicate. Furthermore, this type of identification card must be kept away from magnetic field and direct sunlight so as to prevent the preseted identification code on the magnetic strip thereof from being disturbed or decayed. In general, prior art card identification systems are not so satisfactory in use because of the following disadvantages:

a) it is very difficult to duplicate an identification card by the user, b) the card may be damaged easily when it is inadvertently bent over or back on itself, c) the magnetic strip on the card must be kept away from strong magnetic field and direct sunlight or the identification code thereon will be destroyed, and d) limited materials can be used in making an identification card causing it expensive to manufacture and inconvenient to store.

SUMMARY OF THE PRESENT INVENTION

The present invention has a main object to provide a card identification system in which the identification card can be made from any of a variety of transparent, translucent or opaque materials and easily duplicated by the user.

Another object of the present invention is to provide a card identification system in which the symbol on a card can be varied in shape and previously recorded in a memory of a microprocessor thereof so that the card is precisely detected by a card reader head having an infrared scanning device provided therein.

Accordingly, the present invention of a card identification system comprises generally a card reader head composed of a light generating unit, an analog/digital (A/D) unit, a transmitter/receiver (T/R) unit, a MF & keyboard decode unit, a LCD unit and a CPU, and a reader device composed of a MF & keyboard decode unit, a LCD unit, a memory unit, a CPU and driving circuit thereof. The improvement is characterized in a card reader head having a light generating unit and an A/D unit laterally disposed therein to form a symbol detecting system. When a card is inserted in a slot of the card reader head, a detecting circuit of the light generating unit immediately sends out a signal to the CPU, via a detecting circuit requesting for an interruption and emits concurrently an infrared ray from the light generating unit. Upon the reception of the signal of an interruption request, the CPU conducts immediately an analog/digital converting process according to an induced voltage from an infrared ray receiver and transmits the code to the reader device, via a serial interface for conducting identification therein. Then, a proper action will take place to drive an output device or give a warning signal in accordance with the available instructions.

A new identification card can be registered in the memory via the card reader head and the reader device. The card can be made from any of varied opague or translucent materials and marked or perforated with an identification symbol or symbols thereon.

The objects and advantages of this inventoin will become more apparent in a consideration of enusing the description and drawings.

DETAIL DESCRIPTION OF THE PREFERRED EMBODIMENT OF THE PRESENT INVENTION

Figure 1:
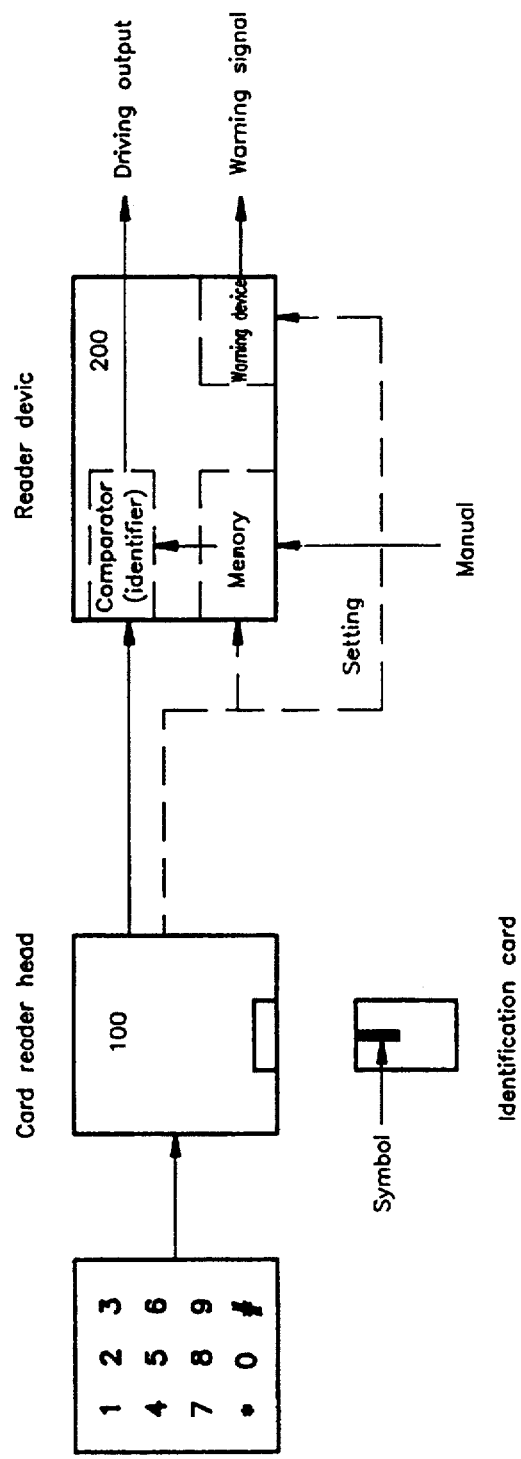
FIG. 1 is a schematic diagram to show a preferred embodiment according to the present invention.
Figure 2:
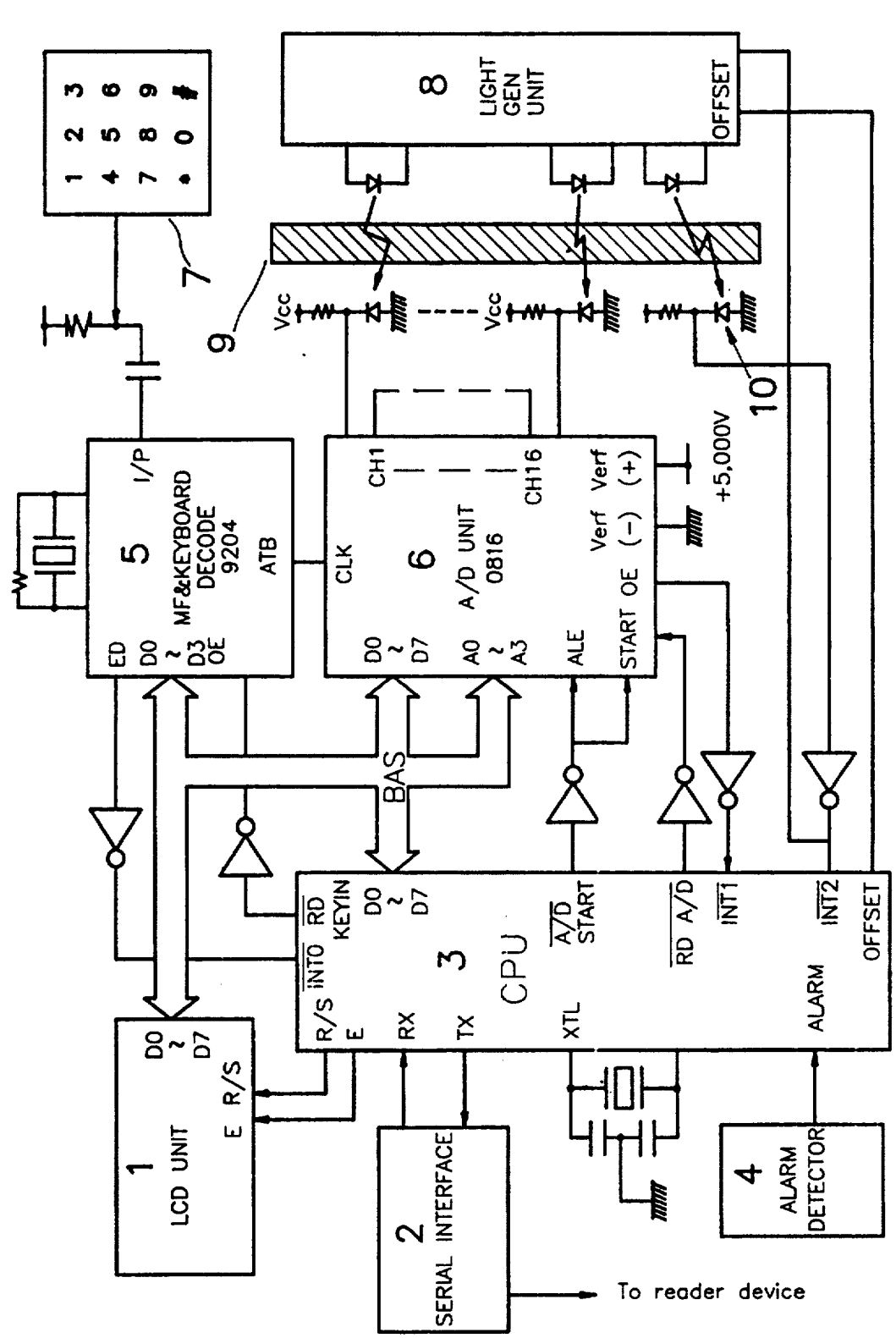
FIG. 2 is a circuit diagram of the card reader head according to the present invention.

Referring to FIGS. 1 and 2 of the drawings, the present invention of a card identification system comprises generally a card reader head 100 and a reader device 200 thereof. The card reader head 100 is composed of a light generating unit 8, an analog/digital (A/D) unit 6, a MF & keyboard decode unit 5, a LCD unit 1 and a CPU 3 therein wherein the light generating unit 8 which is used to control transmitting current of an infrared ray can provide high transmitting current for penetrating an identification card where in a compensation mode or provide aerially mediated low transmitting current to obtain a referential value for the A/D unit 6. The light generating unit 8 can also compensates a weakening LED in corporated with suitable software in order to overcome the reading deviation caused by a replacement of the car reader head 100.

The A/D unit 6 is used to functionally receive a signal of the penetrating intensification (voltage variation). When the infrared ray is interrupted by a identification card, a voltage variation will be converted into a digitalilzed code and transmitted to the CPU unit 3 thereafter.

The MF & keyboard decode unit 5 is solely used to manually input instructions or a code to the CPU unit 3 or A/D unit 6.

The LCD unit 1 is used to display the informations processed in the CPU unit 13 for facilitating the operator to know and control the card reader head 100 its operational situation.

The CPU unit 3 in this system prosecutes logical control, computation of instructions and decoding the informations from the card reader head 100.

Figure 3:
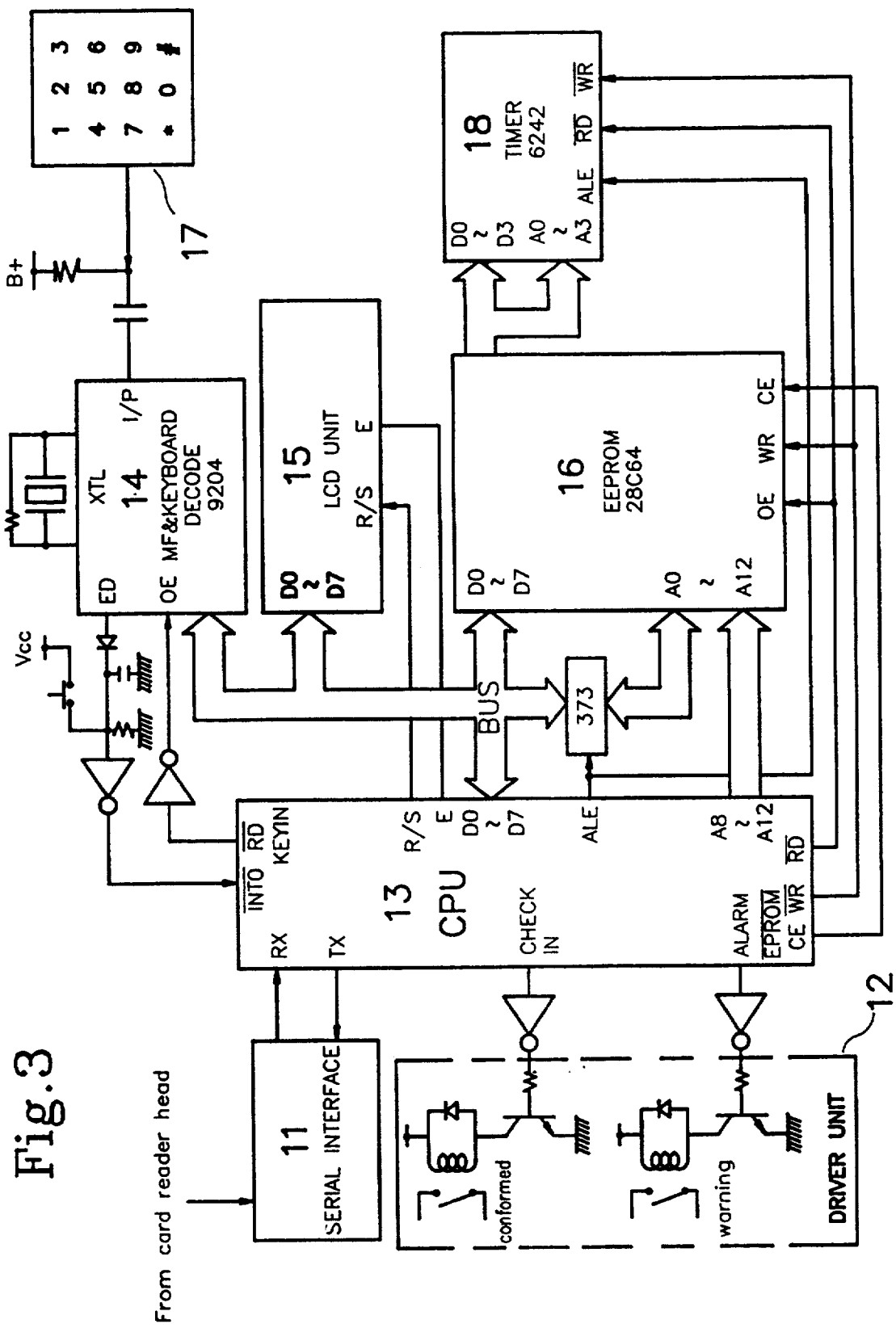
FIG. 3 is a circuit diagram of the comparator according to the present invention.
Figure 4:
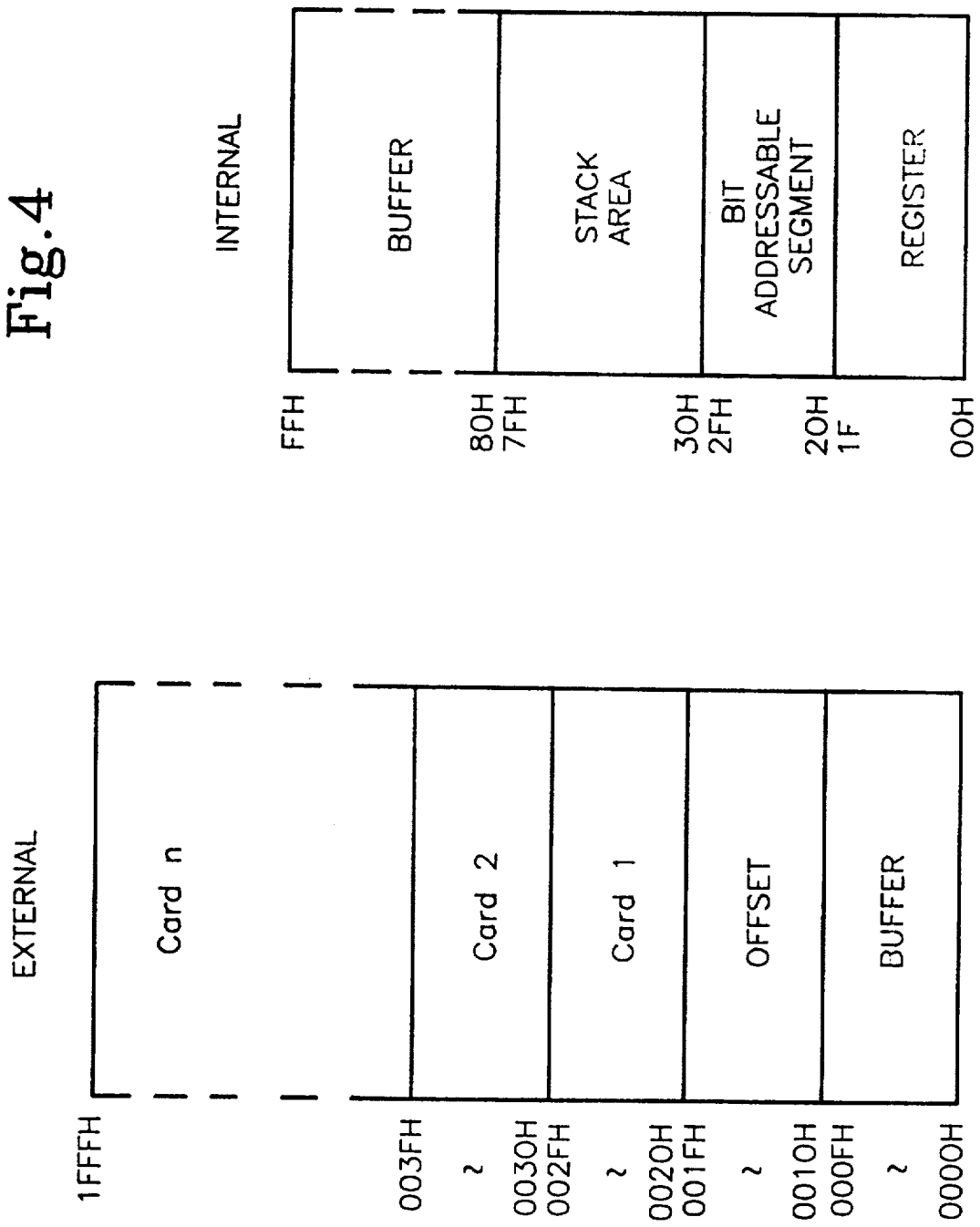
FIG. 4 is a distributive diagram of the memory according to the present invention.

Referring to FIG. 3 of a circuit diagram for the reader device 200 which comprises a MF & keyboard decode unit 14, a LCD unit 15, an EEPROM 16, a CPU unit 13 and a driver unit 12 thereof. Wherein the MF & keyboard decode unit 14 is solely used to imput instruction. The EEPROM 16 is used to store the digitalized data of the identification cards and the offset value from the card reader head 100 (Referring to FIG. 4) or the CPU unit 13 which is responsible to prosecute the logical control of the instruction decoding process for the reader device, the decoding the card informations transmitted from the card reader head 100 and the activating the driver unit 12 to output a confirmation for an identified card or a warning signal if the card does not conform. The LCD unit 15 in the reader device 200 is functionally similar to another LCD unit adapted in the card reader head 100.

Figure 5:
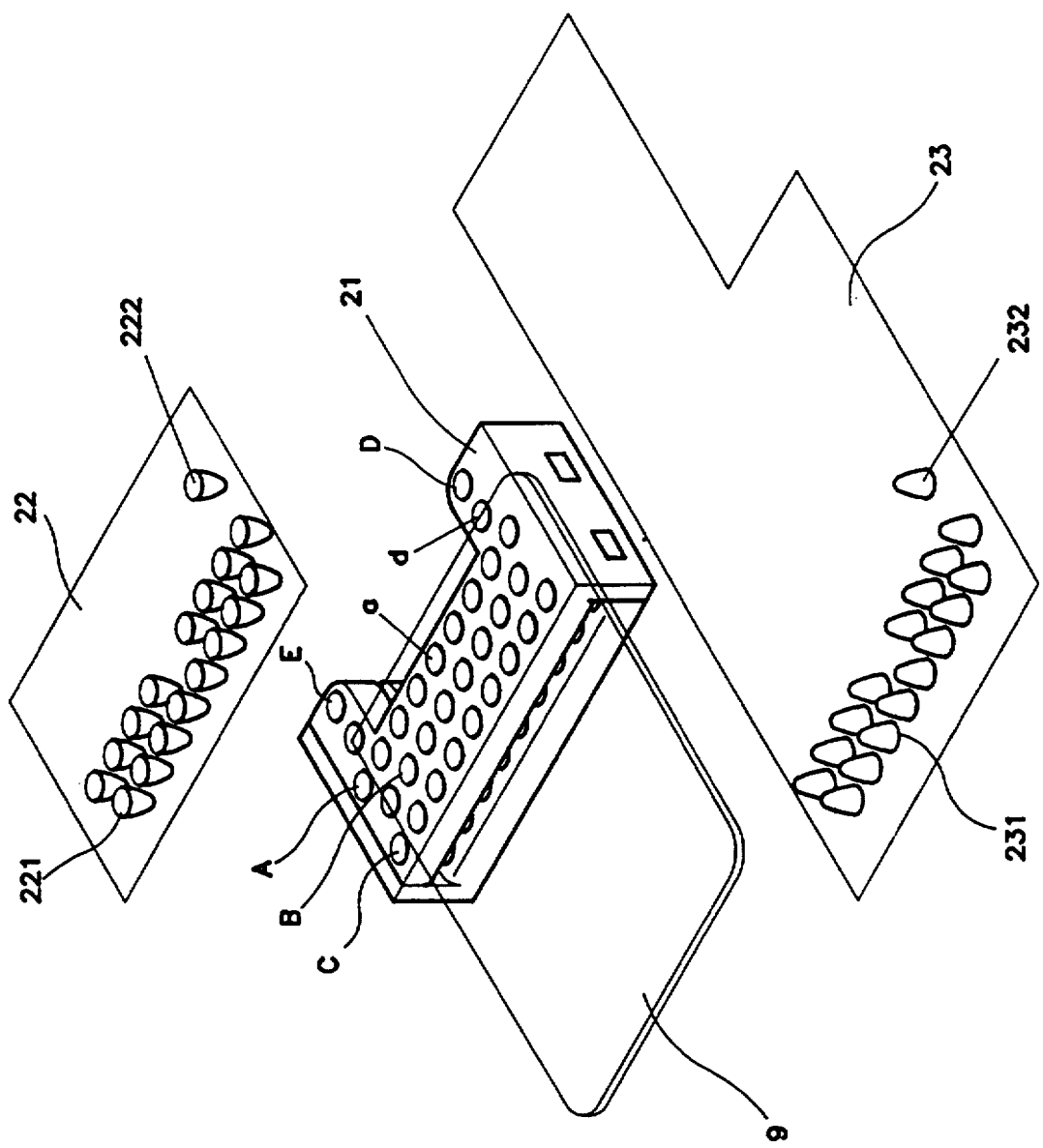
FIG. 5 is a perspective view to indicate the transmitter/receiver unit disposed in the card reader head according to the present invention.

Referring to FIG. 5 of the drawings, the card reader head 100 is generally comprised of a transmitter/-receiver rack 21, a light generating circuit plate 22 and a main circuit plate 23. There are three rows of circular holes A, B and C parallel formed and transversely extended on the upper and bottom housing of the rack 21 in their corresponding positions, in addition to two columns of the circular holes D and E formed on the laterally pronged portions of the rack 21. Wherein row C, hole a of row A, hole d of column D and column E are intendedly reserved for future development. 16 sets of infrared ray transmitters 221 and a card detecting infrared ray transmitter 222 disposed on the light generation circuit plate 22 incorporated with 16 sets of infrared ray receivers 231 and a card delecting infrared ray receiver 232 disposed on the main circuit plate 23 are positioned in registry with the rest of the circular holes on the rack 21.

Figure 6:
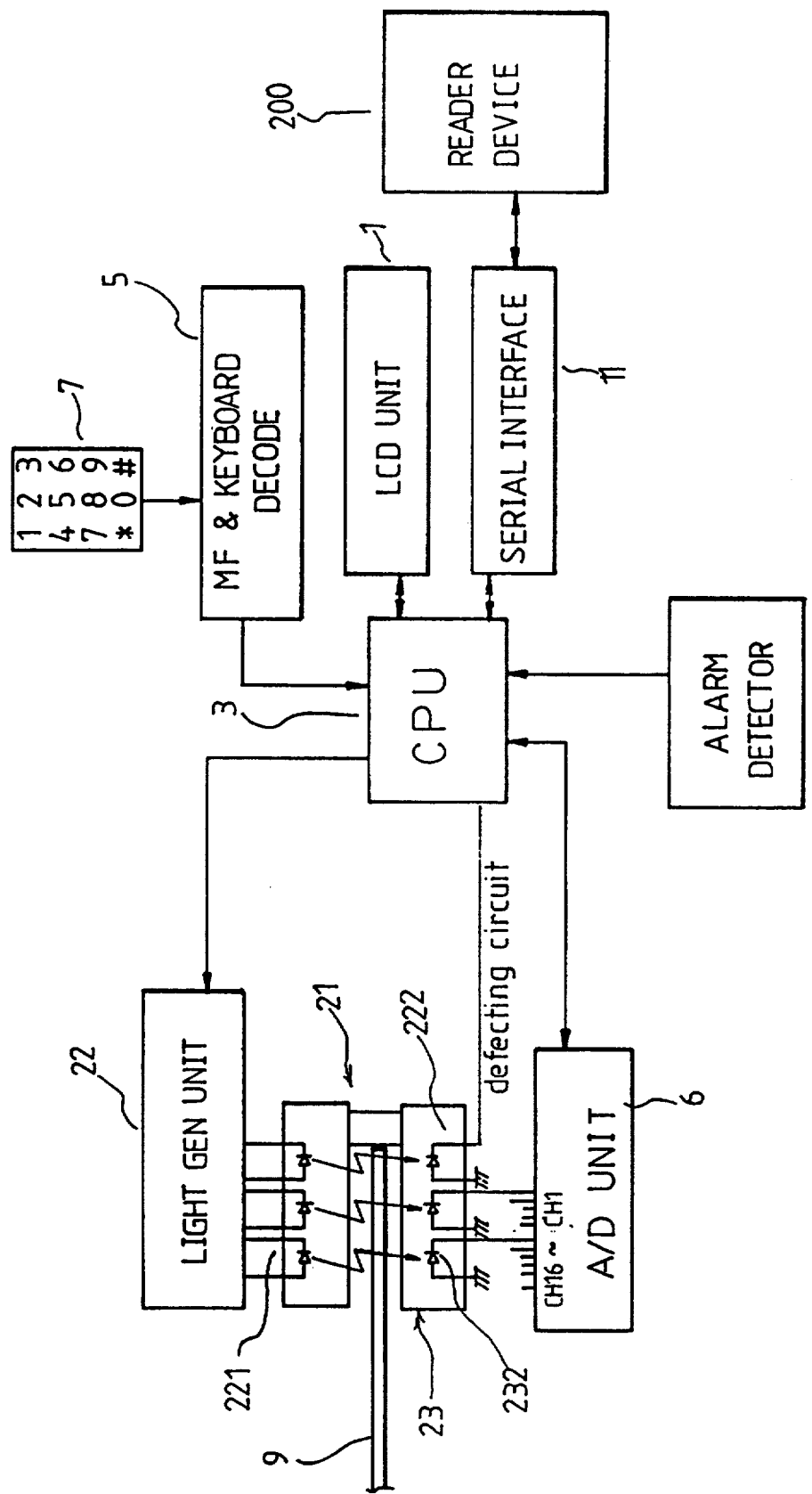
FIG. 6 is a circuit diagram of another version of the card reader head to the present invention.

Referring to FIG. 6, when an identification card 9 is inserted in the slot of the rack 21, a infrared ray transmitted from the card detecting infrared ray transmitter 222 is interrupted so as to immediately send out, via a detecting circuit a signal of a interruption request to the CPU unit 3 and activate concurrently the 16 infrared ray transmitters 221 to transmit their infrared rays directly onto the card 9. Upon receiving the interruption request, the CPU unit 3 conducts simultaneously an anolog/digital converting process according to an induced voltage transmittd from the 16 infrared ray receivers 232 on the main circuit plate 23 and transmits the result code, via the serial interface 11 to the reader device 200 which will drive in accordance with the present instructions the connected output if the comparison has proven identical, or the read-in signal will be denied if the comparison does not conform.

The induced voltage is occurred on the main circuit plate 23 in accordance with the variable coverage of the symbol projected within the periphery of the circular holes on the opposing housing of the rack 21 when an identification card is being scanned sequentially by the 16 infrared ray transmitters 221. Whereby, the card can be made from transparent, translucent or opaque materials and symbolized with opague material or that the card is made from opaque material and perforated with symbols thereon. Because the infrared ray is adapted to the present invention that any business cards e.g., credit cards, club member cards, VIP cards, name cards, or that is made from variety of material, e.g., paper, plastic and metal which are detectable to the card header head 100. The opaque symbols may be printed or labelled with black sticker or write protector. The detected capacity of the card header head 100 can be binarily increased along the quantitative development of the circular holes on the rack 21 incorporated with the addition of the infrared ray transmitters 221 on the light generating circuit plate 22 and the infrared ray receives 231 on the main circuit plate 23.

Referring to FIG. 2 again, the keyboard 7 connected to the card reader head 100 is solely used to input personal code via a verifying system into the memory for updating the registered data in the EEPROM unit 16. The keyboard 7 can directly input personal code which may consist of a single unit, up to twelve digit figures. Therefore, a total of more than one thousand and one hundrfd millions personal codes are available to choose from. In case of power failure, the system can operate continuously for 48 hours before the resumption of the power or the connection of a spare power supply. The reader device 200 comprises two modes, namely a code setting mode and a comparison mode. When the reader device 200 is operated under the code setting mode, any signal transmitted from the card reader head 100 will be decoded and stored in the memory thereof. When the reader device 200 is operated under the comparison mode (it is normally operated under this mode), any signal transmitted from the card reader head 100 will be compared with the data registered in its memory. So that the reader device 200 will drive the connected output if the comparison has proven identical, or the read-in signal will be denied if the comparison does not conform.

The operation of the present invention is outlined hereafter with reference to FIGS. 1 and 3, the first procedure is to set the content of the memory in the reader device 200. When a signal is transmitted from the card reader head 100, it is decoded and then registered in the memory of the reader device 200. The registered code in the memory is designated as "A". Thereafter, any signal transmitted from the card reader head 100 will be compared with the registered identification code "A". For replacing the identification code "A" in the memory of the reader device 200 with a new identification code "B", two alternative methods can be used, one method is to read a new identification card by the card reader head 100 and then let the identification code "B" thus obtained to be registered in the memory, replacing the original identification code "A" (see the dotted line in FIG. 1). The other method is directly change the content in the memory to the new identification code "B" through manual operation. If an input code has proven to be incorrect or a contemplation has found intendedly to damage the card reader head 100, a signal will be sent to the alarm circuit in the reader device 200 causing it to activate an alarm giving a warning of approaching danger.

The reader device 200 will request a read-in OFFSET value from the card reader head 100 at the commencement of the system. The OFFSET value is adapted to record a transmitting/receiving photo-electric physical proporty of the infrared ray LED in the card reader head 100. The OFFSET value will read in periodically thereafter depending upon the system power saving condition to indicate the actual weakening of the luminocity of LED. The reader device 200 will compare the new OFFSET value with the registered OFFSET value to find out a deviation figure if there is any, and then modifies the addressable segment of the identification data registered in the memory (see FIG. 4).

Based on aforediscussed improvement, the present invention of a card identification system provides numerous features and advantages:

a) because of the application of an infrared ray scanning method in detection, the interference by a magnetic forces and static inferference can be eliminated, and a damage twist to the surface of an identification card does not affect the identification operation of the system, b) any material can be used in making an identification card if it is sizably fitting to the car reader head, c) the identification code on an identification card can be easily made by printing or sticking up an opaque symbol or a letting light through symbol perforated on an opaque card.

d) dark colored label, sticker or a write protector are suitable in making symbols thereon, e) the content registered in the memory of the reader device is replaceable with a new code through a manual operation or by means of the operation of the card reader head when the designated identification card is lost, and f) the symbols marked on an identification card can be made in any of a variety of shapes or patterns and therefore, an unlimited number of identification codes are available to choose from.

The scope of this invention should determined by the appended claims and their legal equivalent rather than by the example given in aforediscussed specification.

I claim:

1. A card identification system comprising generally a card reader member comprised of a light generating means, a main circuit A/D means, a transmitter/receiver rack, a MF keyboard decode means, a LCD means and a CPU, and a reader device comprised of a MF keyboard decode means, a LCD means, an EEPROM means, a CPU and a driver circuit thereof; the improvement being characterized in adapting an infrared ray scanning method in said card reader member, when an identification card is inserted in said card reader member, said light generating means immediately requesting via a detecting circuit to said CPU, for a interruption procedure and concurrently activating a transmission of infrared ray onto said identification card, said CPU, upon reception of an interruption request from said light generating means, immediately conducting an analog/digital converting procedure in accordance with an induced voltage detected from an infrared ray receiver and transmitting the result code via a serial interface to said reader device, said reader device being to drive an output device upon the confirmation of a symbol on said identification card with the content data registered in said EEPROM means or to give a warning signal if said symbol being inconformity; said card reader head being further used incorporated with said infrared ray scanning method to detect a symbol on an identification card in making and updating content to be registered in said EEPROM means of said reader device for identification purpose.

2. A card identification system according to claim 1, wherein said identification card is made from a variety of materials sizably fitting to said card reader head.

3. A card identification system according to claim 2, wherein said variety of materials are unlimited in quality.

4. A card identification system according to claim 1, wherein said identification code marked on said identification card is made by printing or perforating a symbol or a sticker or a write protector.

* * * * *